(12) United States Patent
Schweitzer

(10) Patent No.: US 9,121,451 B2
(45) Date of Patent: Sep. 1, 2015

(54) INSTALLATION AND REMOVAL TOOL FOR USE WITH ROLLING ELEMENT BEARINGS

(71) Applicant: Ferdinand Schweitzer, St. Peter in der Au (AT)

(72) Inventor: Ferdinand Schweitzer, St. Peter in der Au (AT)

(73) Assignee: AKTIEBOLAGET SKF, Gothenburg (SE)

( * ) Notice: Subject to any disclaimer, the term of this patent is extended or adjusted under 35 U.S.C. 154(b) by 266 days.

(21) Appl. No.: 13/738,258

(22) Filed: Jan. 10, 2013

(65) Prior Publication Data

US 2013/0180370 A1 Jul. 18, 2013

(30) Foreign Application Priority Data

Jan. 12, 2012 (DE) .......................... 10 2012 200 379

(51) Int. Cl.
*F16C 43/06* (2006.01)
*B25B 27/06* (2006.01)

(52) U.S. Cl.
CPC ............... *F16C 43/065* (2013.01); *B25B 27/06* (2013.01)

(58) Field of Classification Search
CPC .......... B25D 1/16; B25B 27/00; B25B 27/02; B25B 27/06; B25B 27/08; B25B 27/12; B25B 27/14; B25B 27/16; F16C 43/06; F16C 43/065
USPC ............... 81/463, 27, 487, 176.3, 175, 185.1, 81/185.2; 29/254, 255
See application file for complete search history.

(56) References Cited

U.S. PATENT DOCUMENTS

| 212,795 | A | * | 3/1879 | Fisher | 81/175 |
| 819,795 | A | * | 5/1906 | Porter | 81/175 |
| 1,007,248 | A | * | 10/1911 | Smith | 29/255 |
| 1,330,514 | A | * | 2/1920 | Brooks | 81/487 |
| 1,525,894 | A | * | 2/1925 | Seppmann | 29/255 |
| 2,779,089 | A |  | 1/1957 | Allen |  |
| 3,387,814 | A | * | 6/1968 | Fischer | 248/507 |
| 3,739,452 | A | * | 6/1973 | Gadberry | 29/254 |
| 3,886,823 | A | * | 6/1975 | Gonzalez et al. | 81/175 |
| 4,335,493 | A |  | 6/1982 | Shivers, Jr. et al. |  |
| 5,207,730 | A | * | 5/1993 | Ruggiero | 29/255 |

FOREIGN PATENT DOCUMENTS

| DE | 19547773 A1 | 6/1996 |
| DE | 202010002521 U1 | 6/2010 |
| DE | 202009017627 U1 | 9/2010 |
| DE | 102009057092 A1 | 6/2011 |
| FR | 630900 A | 12/1927 |
| JP | 9262779 A | 10/1997 |
| JP | 2001277148 A | 10/2001 |

* cited by examiner

*Primary Examiner* — Hadi Shakeri
(74) *Attorney, Agent, or Firm* — Bryan Peckjian; SKF USA Inc. Patent Dept.

(57) ABSTRACT

A tool is disclosed for installing a rolling element into, and removing the rolling element out of, a rolling-element bearing cage. The tool has a gripping element including a clampable jaw disposed on a base. The clampable jaw includes at least two interacting parts. At least one first screw is screwed into a first threaded bore defined in the base. The at least one first screw can be tightened to clamp together the at least two interacting parts of the jaw. A first end of the rod is attached to the base. An impact weight is coupled to the rod and is displaceable along the longitudinal axis of the rod. Further, a stop is fixedly disposed on the rod at a location spaced from the gripping element. The stop is designed to be struck by the impact weight.

20 Claims, 1 Drawing Sheet

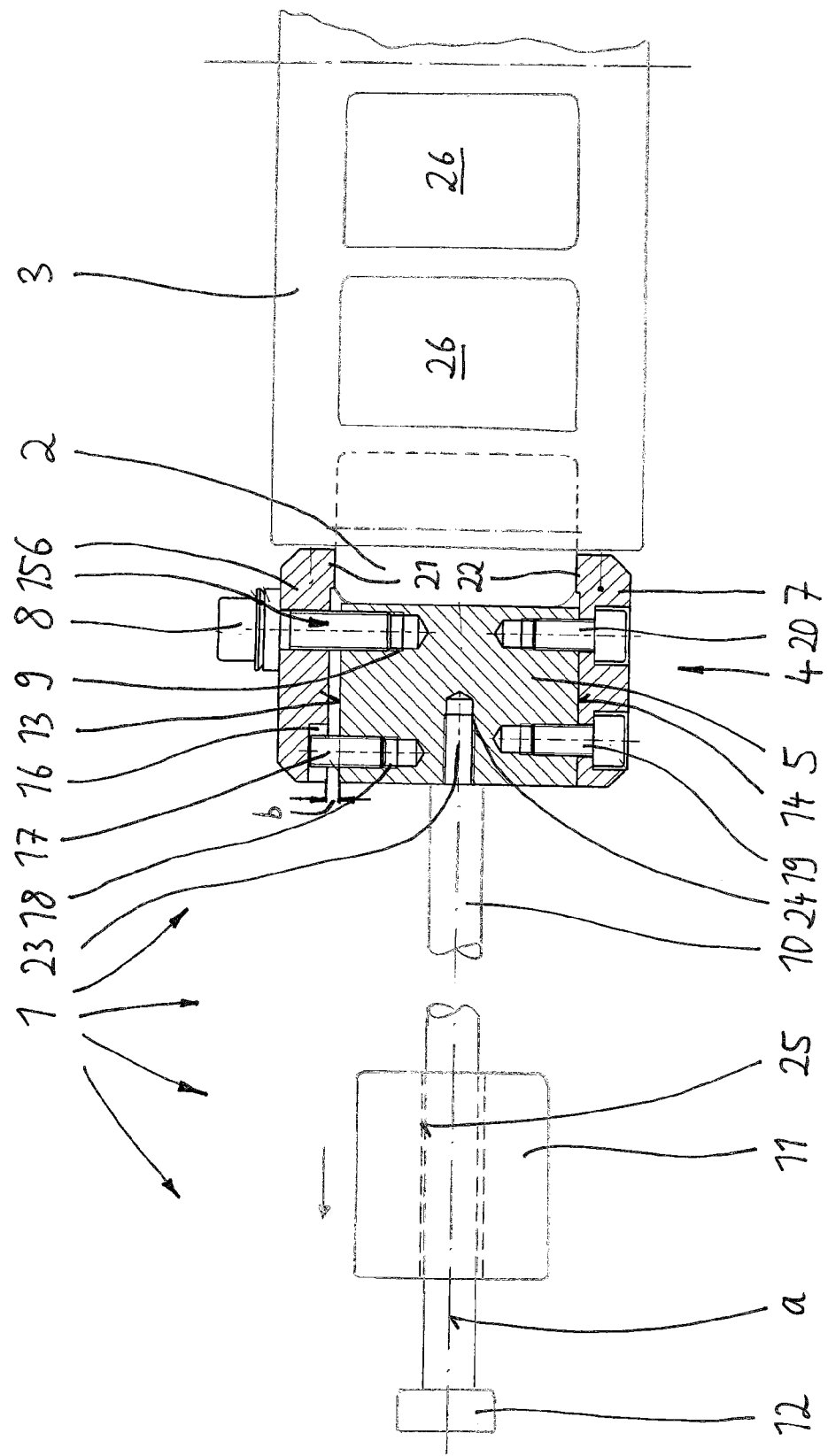

INSTALLATION AND REMOVAL TOOL FOR USE WITH ROLLING ELEMENT BEARINGS

CROSS-REFERENCE

This application claims priority to German patent application no. 10 2012 200 379.7 filed on Jan. 12, 2012, the contents of which are fully incorporated herein by reference.

TECHNICAL FIELD

The present invention generally relates to a tool designed for installing and removing rolling elements into and out of a rolling-element bearing cage.

BACKGROUND

Some specialized rolling-element bearings, in particular in the form of cylindrical roller bearings, include a window-type cage, in which the cylindrical rollers are disposed. The windows of the cage are formed such that the cylindrical rollers cannot fall radially outwards out of an assembled unit comprised of a bearing inner ring, cage, and cylindrical rollers. For this purpose, the cage bridges each have a slight undercut, which prevents the cylindrical rollers from falling out. Such bearings can be used for example in traction motors in railway applications.

In railway applications, high strength cages made from a special bronze are needed so that the bearing can withstand the large loads occurring during operation without any problems.

However, a disadvantage of bearings of this type is that, as a consequence of the high strength of the cage, it is not possible to disassemble the assembled unit comprised of the bearing inner ring, cage, and cylindrical rollers without first removing the inner ring. That is, only after the inner ring has been removed can the cylindrical rollers be removed from the cage in a radially inward direction so as to be released from the undercut. The reinstallation of a cylindrical roller in the cage pocket is problematic in a corresponding manner.

Even if the cage bridges have a slight undercut, the cylindrical rollers can be removed by radial extraction if, for example, plastic is used as the cage material; the bearing can thus be disassembled, e.g., for inspection purposes. But, such a disassembly is no longer possible in this manner if the cage is made from the above-mentioned high-strength bronze material.

Rather, even with optimal manufacturing tolerances necessitated by the design of the solid cage and its manufacture from high-strength bronze, a non-destructive disassembly and reassembly of such bearing has not been possible.

This problem is especially troublesome if a bearing inspection, —maintenance and/or —repair should take place on site in mobile applications (e.g., railroad cars).

SUMMARY

It is an object of the present teachings to provide an installation and removal tool for a rolling-element bearing that enables the removal of one or more rolling elements from the bearing cage in a simple way, even with high-strength cage materials, as well as the subsequent re-installation of the rolling element(s).

In addition or in the alternative, the installation and removal tool preferably facilitates on-site disassembly/reassembly of a bearing for mobile applications (e.g., railway applications). Preferably, the tool is constructed in a relatively simple manner and is able to be used without further additional components or devices.

In one aspect of the present teachings, the installation and removal tool preferably comprises:
- a gripping element, which includes a base and a clampable jaw, wherein at least one screw for clamping the jaw is screwed into a threaded bore defined in the base, and wherein at least two interacting parts of the jaw are clampable together by tightening the screw,
- a rod attached to the base of the gripping element,
- an impact weight is disposed on the road so as to be displaceable along the longitudinal axis of the rod, and
- a stop for the impact weight, wherein the stop is fixedly disposed on the rod at a location spaced from the gripping element.

The jaw can be formed, e.g., from two plates which are screwed or screwable onto opposing end sides of the base. One of the plates forming the jaw can thus be detachably connected to the base using the screw provided for the clamping of the jaw. The screw is disposed in an end portion of the base that is opposite of the rod.

The screw provided for clamping the jaw is preferably formed as a screw having a hexagonal (socket) screw head.

The detachable plate of the jaw can further include an opening, in which a spacer can engage. The spacer adjustably maintains a spacing between one of the end sides of the base and the movable plate of the jaw. The parallelism of the two plates forming the jaw, when clamping a rolling element, can also thereby be ensured. The spacer can be formed as a threaded pin, which is screwed into a threaded bore defined in the base.

The other (immovable) plate forming the jaw can be fixedly screwed onto the base using two screws.

The plates forming the jaw can each include a protruding, gripping portion on the end of the plate opposite of the rod.

At least one end of the rod can include a threaded section, which is screwed into a threaded bore defined in the base. The rod is thereby fixedly connected to the base and/or the gripping element.

The impact weight is preferably formed as a hollow cylindrical body having a central bore, through which the rod is inserted.

In one aspect of the present teachings, the rolling element to be installed or removed, e.g., a cylindrical roller, is clamped using the gripping element like a pair of smooth, parallel pliers. Then, the rolling element is pulled out of (extracted from) the pocket of the bearing cage by striking the impact weight against the stop, e.g., once or twice. The individual rolling elements are then removed one after another from the cage by repeating this process for all rolling elements.

By using the tool according to the present teachings, a non-destructive removal of all rolling elements is thus possible, e.g., within a few minutes, without the need for any additional components or devices.

One advantageous aspect of the present teachings is that the contact surfaces of the jaw, which grip the rolling element, are as smooth and flat as possible, so that no damage occurs to the end sides of the rolling elements. Further, the contact surfaces between the rolling elements and the clamping surfaces of the jaw can be relatively large, which enables the largest possible frictional forces to be applied.

The tool according to the present teachings may be designed relatively small or compact, and can be used at any time on site, to facilitate a non-destructive inspection (disassembly) of a rolling-element bearing, e.g., a cylindrical roller bearing.

The tool also can be used in an analogous manner to reinstall a removed rolling element back in the cage. For this purpose the rolling element is clamped using the gripping element and then the rolling element is "hammered" into the corresponding receiving window (pocket) of the bearing cage by striking the impact weight against the base of the tool.

Further objects, aspects, embodiments, advantages and designs of the present teachings will be explained in the following, or will become apparent, with the assistance of the exemplary embodiments and the appended FIGURES.

BRIEF DESCRIPTION OF THE DRAWING

The sole FIGURE shows a representative installation and removal tool according to the present teachings, wherein in particular the process of removing a cylindrical roller from a bearing cage is shown.

DETAILED DESCRIPTION OF THE INVENTION

In the FIGURE, a rolling-element bearing cage 3 can be seen that is a part of a cylindrical roller bearing (not completely shown). The bearing cage 3 includes a plurality of receiving pockets 26, in which are disposed rolling elements 2, e.g., in the form of cylindrical rollers. In the present embodiment—which is not shown in more detail—the rolling-element bearing cage 3 may be mounted on the bearing inner ring, so that a simple extraction of the cylindrical rollers 2 in the radially-inward direction is not possible. Rather, the cylindrical rollers 2 should be removed with the inner ring still mounted.

The present installation and removal tool 1 is provided for this purpose and is basically comprised of three main components: a gripping element 4, a rod 10, and an impact weight 11, which is disposed on the rod 10 in a displaceable manner.

The gripping element 4 includes a block-shaped base 5, wherein two plates 6 and 7 are respectively disposed on two opposing end sides 13 and 14. The two plates 6, 7 together form a jaw which—as shown—can clamp the longitudinal (axial) end sides of each cylindrical roller 2 installed in the cage 3. That is, the two plates 6, 7 clamp only the end portions of the roller 2 that protrude from the contour or profile of the cage 3.

The lower plate 7 is fixed to the base 5 as a fixed or immovable plate. For example, two screws 19 and 20 may immovably affix the plate 7 to the base 5.

On the other hand, the other, upper plate 6 is formed as a detachable (movable) plate, i.e. it can be detached from (or moved relative to) the base 5 to release the clamping of the cylindrical roller 2. To clamp the cylindrical roller 2, the plate 6 is screwed onto the base 5 with the cylindrical roller 2 disposed between the plates 6, 7. A screw 8 (e.g., a hexagonal socket screw) may be screwed into a threaded bore 9 in the base 5 in order to cause the plates 6, 7 to clamp against the roller 2. The screw 8 is disposed in an end portion 15 of the base 5.

In order to maintain the two plates 6 and 7 as parallel as possible for any particular clamping width (i.e. that corresponds to the length of the cylindrical roller 2), an opening or recess 16 is provided in the plate 6. A spacer 17 (e.g., a threaded pin) is screwed into a threaded bore 18 defined in the base 5, and is threadably adjustable such that, after tightening the screw 8 and clamping the cylindrical roller 2, the two plates 6, 7 extend parallel to each other. The correct or best spacing b for achieving parallel plates 6, 7 in the clamped state is thus adjustably set by the spacer 17.

A reliable clamping of the cylindrical roller 2 is ensured by protruding, gripping portions 21 and 22 that are defined on the plates 6, 7. The gripping portions 21 and 22 are preferably smooth (i.e. free of grooves and/or protrusions) in order to avoid damaging the longitudinal (axial) end side regions of the cylindrical rollers 2 when removing or installing them.

A further threaded bore 24 is defined in the base 5 and threadably receives a thread or threaded section 23 defined on one end of the rod 10. Thus, the rod 10 can be detachably attached to the gripping element 4 via this threaded connection.

A stop 12 is fixed to the opposite end of the rod 10 and defines an impact surface for the impact weight 11. The impact weight 11 is designed as a hollow cylinder and can be displaced via its central bore 25 along the longitudinal axis a of the rod 10 in the direction of the arrow.

In order to remove the roller 2, the tool 1 is attached to the cylindrical roller 2 as shown and the screw 8 is tightened. The cylindrical roller 2 is thus tightly clamped by the gripping element 4.

Then, the impact weight 11 is struck hard one or two times against the stop 12. The force of the impact overcomes the slight undercut and the high cage strength so that the cylindrical roller 2 is pulled out of the receiving pocket 26.

This process is repeated until all of the rolling elements 2 are removed from the cage 3.

After an inspection, maintenance and/or repair of the bearing, the roller element installation process takes place in the reverse manner. That is, the free cylindrical roller 2 is clamped again in the above-described manner, set against the receiving pocket 26, and using the impact weight 12—now opposite of the direction of the arrow—is installed back into the cage, i.e. it is "hammered" by striking the impact weight one or more times against the base 5.

Representative, non-limiting examples of the present invention were described above in detail with reference to the attached drawings. This detailed description is merely intended to teach a person of skill in the art further details for practicing preferred aspects of the present teachings and is not intended to limit the scope of the invention. Furthermore, each of the additional features and teachings disclosed above may be utilized separately or in conjunction with other features and teachings to provide improved installation/removal tools for bearing cages and methods for manufacturing and using the same.

Moreover, combinations of features and steps disclosed in the above detailed description may not be necessary to practice the invention in the broadest sense, and are instead taught merely to particularly describe representative examples of the invention. Furthermore, various features of the above-described representative examples, as well as the various independent and dependent claims below, may be combined in ways that are not specifically and explicitly enumerated in order to provide additional useful embodiments of the present teachings.

All features disclosed in the description and/or the claims are intended to be disclosed separately and independently from each other for the purpose of original written disclosure, as well as for the purpose of restricting the claimed subject matter, independent of the compositions of the features in the embodiments and/or the claims. In addition, all value ranges or indications of groups of entities are intended to disclose every possible intermediate value or intermediate entity for the purpose of original written disclosure, as well as for the purpose of restricting the claimed subject matter.

REFERENCE NUMBER LIST

1 Installation and Removal Tool
2 Rolling element
3 Rolling-element bearing cage
4 Gripping element
5 Base
6, 7 Jaw
6 Releasable plate
7 Fixed plate
8 Screw (socket screw)
9 Threaded bore
10 Rod
11 Impact weight
12 Stop
13 End side
14 End side
15 End portion
16 Opening
17 Spacer
18 Threaded bore
19 Screw
20 Screw
21 Gripping portion
22 Gripping portion
23 Threaded section
24 Threaded bore
25 Central bore
26 Receiving pocket
a Longitudinal axis
b Spacing

The invention claimed is:

1. A tool for installing a rolling element into, and removing the rolling element out of, a rolling-element bearing cage, the tool comprising:
   a gripping element including a clampable jaw disposed on a base, the clampable jaw comprising at least two interacting parts disposed on opposing end sides of the base such that contact therebetween is prevented, the gripping element being configured such that the at least two interacting parts can be aligned parallel relative to each other when engaging an object therebetween, one of the at least two interacting parts being non-movably fixed to the base such that a remainder of the at least two interacting parts can be moved independently therefrom,
   at least one first screw extending through said a remainder of the at least two interacting parts and screwed into a first threaded bore defined in the base connecting said a remainder of the at least two interacting parts to the base, the at least one first screw being configured to tighten the at least two interacting parts of the jaw to clamp them together,
   a rod attached to the base at a first end thereof and having a longitudinal axis, an impact weight coupled to the rod and being displaceable along the longitudinal axis of the rod, and
   a stop fixedly disposed on the rod at a location spaced from the gripping element, the stop being configured to be struck by the impact weight.

2. The tool according to claim 1, wherein the at least two interacting parts are first and second plates that are screwed onto said opposing end sides of the base.

3. The tool according to claim 2, wherein the first plate is detachably connected to the base via the at least one first screw, and the at least one first screw is disposed in an end portion of the base that is opposite of the rod.

4. The tool according to claim 2, wherein the second plate is fixedly and immovably screwed onto the base.

5. The tool according to claim 2, wherein each of the first and second plates has a protruding, gripping portion on an end opposite of the rod.

6. The tool according to claim 5, wherein each protruding, gripping portion is defined by a smooth surface.

7. The tool according to claim 1, wherein the at least one first screw has a hexagonal screw head.

8. The tool according to claim 1, wherein the first end of the rod has a threaded section that is screwed into a second threaded bore defined in the base.

9. The tool according to claim 1, wherein the impact weight is formed as a hollow cylindrical body having a central bore, the rod extending through the central bore.

10. A tool for installing a rolling element into, and removing the rolling element out of, a rolling-element bearing cage, the tool comprising:
    a gripping element including a clampable jaw disposed on a base, the clampable jaw comprising at least two interacting parts,
    at least one first screw screwed into a first threaded bore defined in the base, the at least one first screw being configured to tighten the at least two interacting parts of the jaw to clamp them together,
    a rod attached to the base at a first end thereof and having a longitudinal axis,
    an impact weight coupled to the rod and being displaceable along the longitudinal axis of the rod,
    a stop fixedly disposed on the rod at a location spaced from the gripping element, the stop being configured to be struck by the impact weight,
    the at least two interacting parts are first and second plates that are screwed onto opposing end sides of the base,
    the first plate is detachably connected to the base via the at least one first screw, and
    the at least one first screw is disposed in an end portion of the base that is opposite of the rod,
    the first plate of the jaw has a recess defined on a side opposing an outer surface of the base and
    a spacer is disposed in the recess, the spacer being configured to adjustably maintain a spacing between one of the opposing end sides of the base and the first plate of the jaw, a side of the spacer opposite the recess being partially disposed within a bore in the base.

11. The tool according to claim 10, wherein the spacer is a threaded pin that is screwed into a second threaded bore defined in the base.

12. The tool according to claim 11, wherein the second plate is fixedly and immovably screwed onto the base.

13. The tool according to claim 12, wherein each of the first and second plates has a protruding, gripping portion on an end opposite of the rod.

14. The tool according to claim 13, wherein the first end of the rod has a threaded section that is screwed into a third threaded bore defined in the base.

15. The tool according to claim 14, wherein the impact weight is formed as a hollow cylindrical body having a central bore, the rod extending through the central bore.

16. A tool for installing a rolling element into, and removing the rolling element out of, a rolling-element bearing cage, the tool comprising:
    a base,
    a clampable jaw coupled to the base and comprising at least first and second plates configured to clamp opposite ends of the rolling element therebetween, at least one first screw screwed into a first threaded bore defined in the base, the at least one first screw being configured to squeeze the first and second plates together by tightening the screw into the base, a rod extending along a longitudinal axis and having a first end and a second end, the first end being attached to the base, an impact weight coupled to the rod so as to be displaceable along the longitudinal axis of the rod, and a stop fixedly disposed on the second end of the rod, the stop being configured to be struck by the impact weight, wherein the first plate of the jaw has a recess defined on a side opposing an outer surface of the base and a spacer is disposed in the recess, the spacer being configured to adjustably maintain a spacing between one of the end sides of the base and the first plate of the jaw, a side of the spacer opposite the recess being partially disposed within a bore in the base.

17. The tool according to claim 16, wherein the first end of the rod has a threaded section that is screwed into a second threaded bore defined in the base.

18. The tool according to claim 17, wherein the spacer is a threaded pin is screwed into a third threaded bore defined in the base.

19. The tool according to claim 16, wherein each of the first and second plates has a protruding, gripping portion defined on an end opposite of the rod.

20. The tool according to claim 16, wherein the impact weight has a central bore and the rod extends through the central bore.

* * * * *